E. H. KELLY.
Watchmakers' Lathes.

No. 144,547.            Patented Nov. 11, 1873.

Witnesses:            Inventor.
Franck L. Durand            Edward H. Kelly,
C. L. Everts            per Alexander Mason
           Attorneys.

UNITED STATES PATENT OFFICE.

EDWARD H. KELLY, OF JACKSON, TENNESSEE.

IMPROVEMENT IN WATCHMAKERS' LATHES.

Specification forming part of Letters Patent No. 144,547, dated November 11, 1873; application filed April 3, 1873.

*To all whom it may concern:*

Be it known that I, EDWARD H. KELLY, of Jackson, in the county of Madison and in the State of Tennessee, have invented certain new and useful Improvements in Implements for Pivoting Pinions and Staffs in Watches of any pattern or manufacture; and do hereby declare that the following is a full, clear, and exact description thereof, reference being had to the accompanying drawings and to the letters of reference marked thereon, making a part of this specification.

Heretofore, in the manufacture and repair of watches, when it has been necessary to drill a hole in the end of a pinion-pivot or other pin in the watch, this has invariably been done by hand, and as a natural consequence many drills are broken and the hole very often is out of the true center. To remedy this evil is the object of my invention, and I accomplish the same by removing one of the ordinary centers of a watchmaker's lathe, and substituting therefor a tubular center having a bore of sufficient size for the drill and drill-holder to pass through. The pin to be bored is then placed in the lathe when it can be bored perfectly true.

The nature of my invention, therefore, consists in a tubular lathe-center for holding and guiding the drill, as will be hereinafter more fully set forth.

In order to enable others skilled in the art to which my invention appertains to make and use the same, I will now proceed to describe its construction and operation, referring to the annexed drawing, in which—

Figure 1:
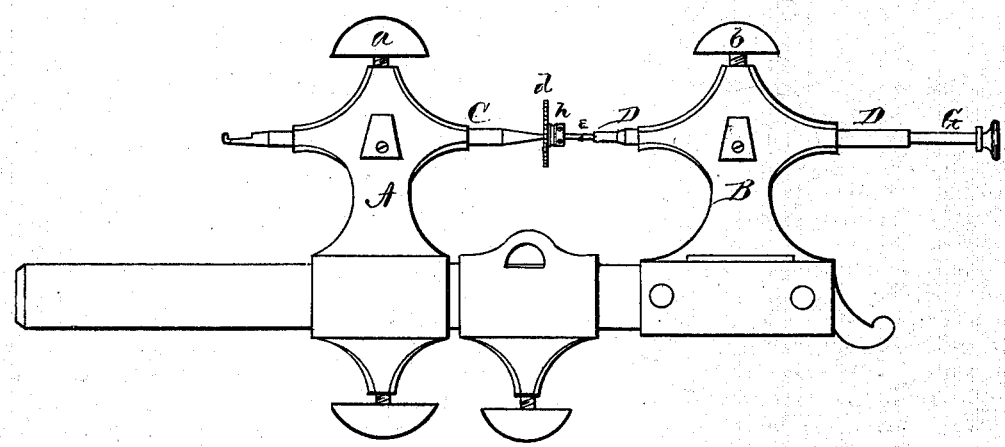
Figure 2:
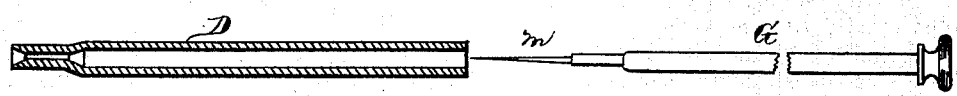

Figure 1 is a side elevation of a watchmaker's lathe embodying my invention; and Fig. 2 is a longitudinal section of the tubular center with a side view of the drill and holder.

Similar letters of reference indicate corresponding parts.

A and B represent the center-rests of a watchmaker's lathe. C represents the ordinary center placed in the rest A and secured by a set-screw, $a$. In place of a similar center in the rest B, I use a tubular center, D, constructed as shown in Fig. 2, and secured in any desired place by the set-screw $b$. $d$ represents a pinion, the pin or pivot $e$ of which it is desired to bore. This pinion is placed between the centers C and D, with that end of the pin $e$ to be bored in the center D. A collet, $h$, is placed on the pin $e$, so as to use the ordinary bow for rapidly revolving the pin. $m$ represents the drill inserted, in the usual manner, in a holder, G, and said drill and holder passed through the tubular center D, when the point of the drill will naturally strike directly in the center of the end of the pin and bore a hole in the same true in the center.

For different-sized drills different-sized tubular centers must, of course, be provided, as the drill and holder must fit snugly in the bore of the same.

Having thus fully described my invention, what I claim as new, and desire to secure by Letters Patent, is—

In a watchmaker's lathe, a tubular center, D, for holding and guiding the drill in boring the ends of pivots or pins, as herein set forth.

In testimony that I claim the foregoing I have hereunto set my hand this 24th day of March, 1873.

E. H. KELLY.

Witnesses:
 JAS. O'CONNOR,
 G. H. RAMSEY.